Aug. 9, 1927.
I. NETTLES
VELOCIPEDE
Filed Aug. 9, 1924
1,638,781
3 Sheets-Sheet 1
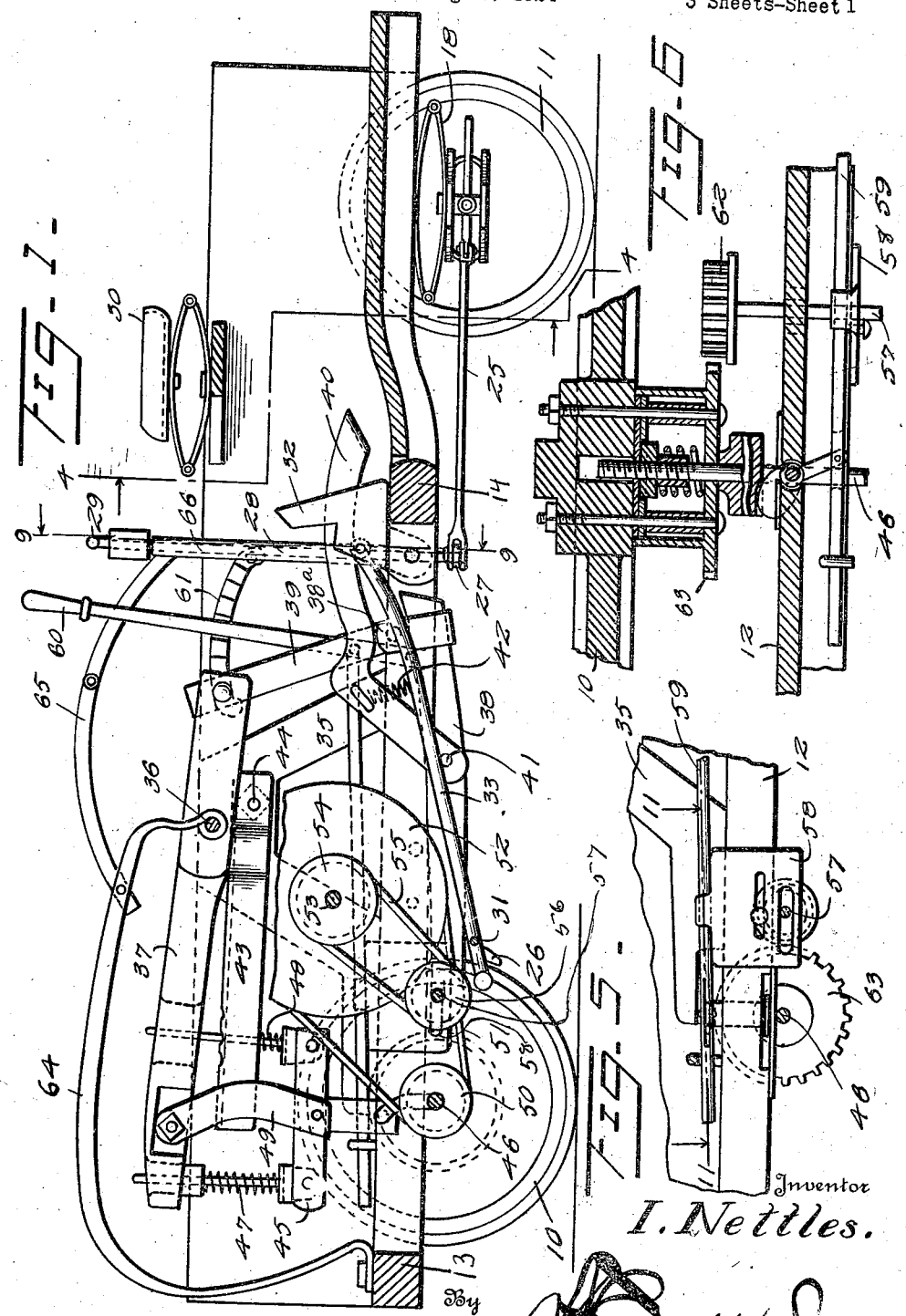
Inventor
I. Nettles.

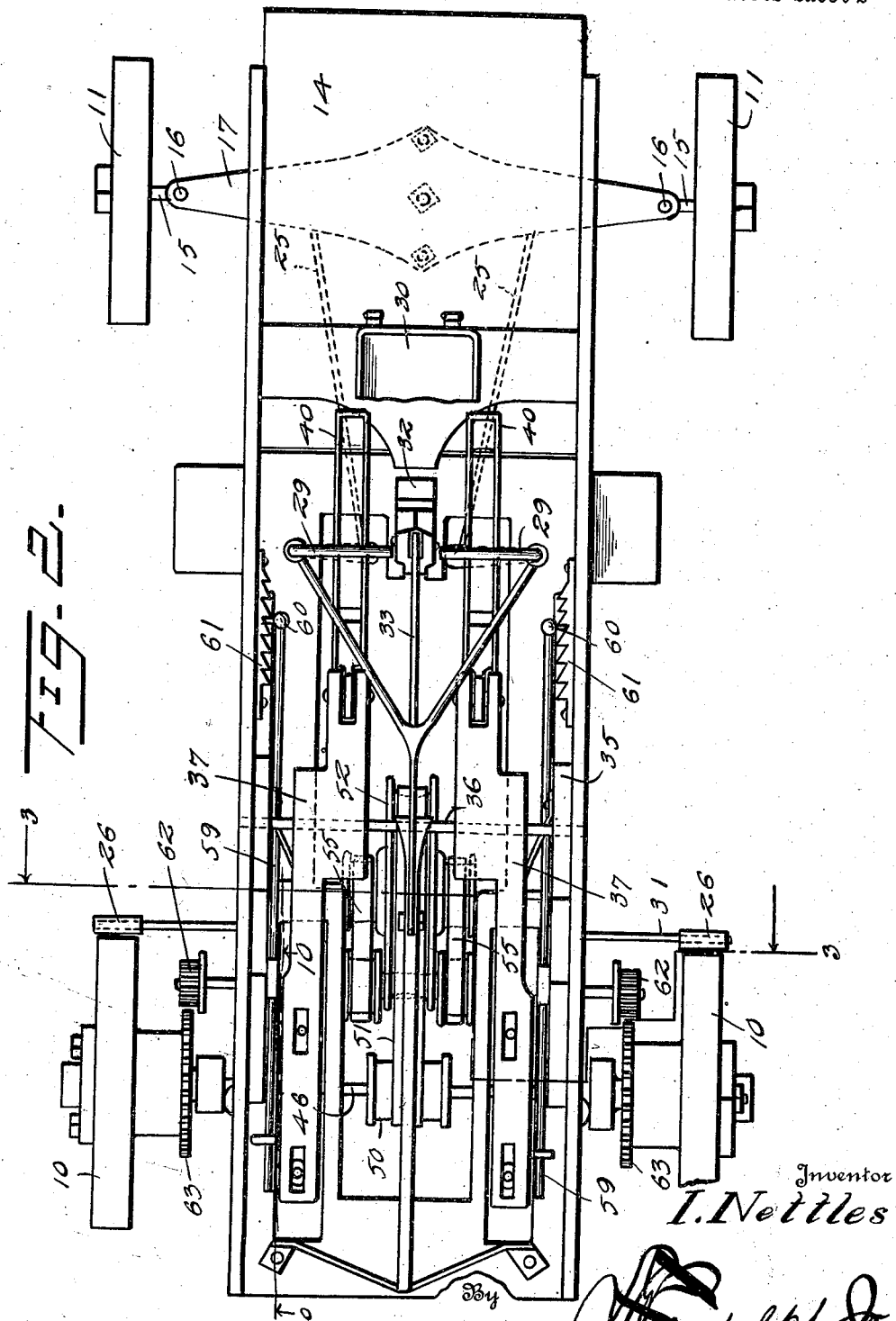

Aug. 9, 1927.
I. NETTLES
VELOCIPEDE
Filed Aug. 9, 1924
1,638,781
3 Sheets-Sheet 3
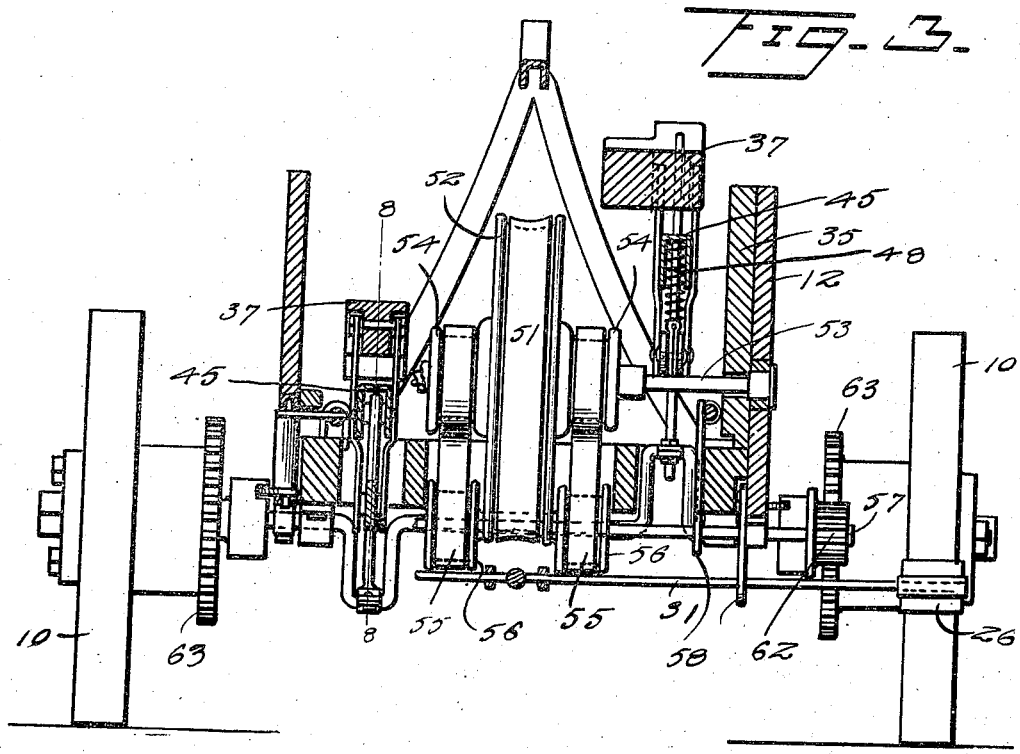
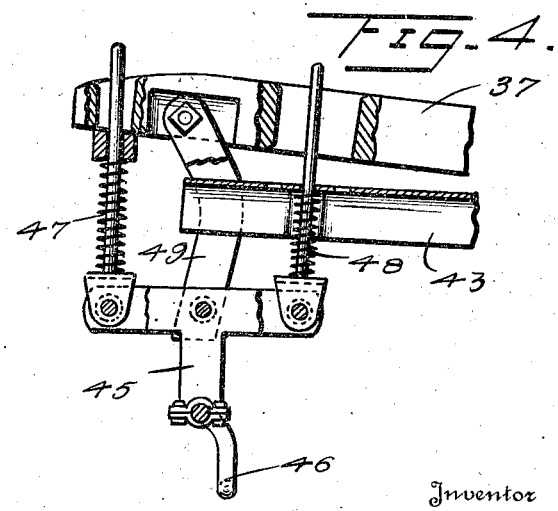
Inventor
I. Nettles
By *[signature]*, Attorney Patented Aug. 9, 1927.

1,638,781

UNITED STATES PATENT OFFICE.

ISAAC NETTLES, OF CLEVELAND, OHIO.

VELOCIPEDE.

Application filed August 9, 1924. Serial No. 731,086.

This invention relates to vehicles of the type adapted to be manually propelled the same including a crank shaft and a pedal mechanism.

The object of the present invention is the provision of a machine which is adapted for use commercially as well as for pleasure and which may be propelled by the expenditure of a minimum amount of manual energy, the machine being easily handled and readily manipulated.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a vertical longitudinal sectional view of a velocipede embodying the invention;

Figure 2 is a top plan view thereof;

Figure 3 is a vertical transverse sectional view on the line 3—3 of Figure 2;

Figure 4 is a detail view of a portion of the pedal mechanism on the line 8—8 of Figure 3;

Figure 5 is an enlarged sectional view on the line 10—10 of Figure 2; and

Figure 6 is a detail sectional view on the line 11—11 of Figure 10.

Corresponding and like parts are referred to in the following description and designated in the several views of the drawings by like reference characters.

The machine embodies a main frame which may be of any preferred construction and which is mounted upon front wheels 10 and rear wheels 11 the front wheels constituting the drivers and the rear wheels the means whereby the vehicle is steered. The main frame as shown is of rectangular formation and comprises longitudinal side bars 12 and transverse connecting bars 13 and 14. The rear wheels 11 are mounted upon axles 15 which are pivoted intermediate their ends, as indicated at 16 between the upper and lower members of bolsters 17, 18 indicating springs between the upper bolster members and the main frame. Rods 25 connect axles 15 with arms 27 projecting laterally from vertically disposed rods 28 which are provided at their upper ends with handle bars 29 extending within convenient reach of the driver's seat 30.

Brake shoes 26 at the ends of a transverse rod 31 are adapted to be applied to the front wheels 10. A foot lever 32 accessible to the driver's seat 30 is connected by means of a rod 33 with the brake rod 31 whereby to admit of application of the brake when required.

Standards 35 project upwardly from the main frame and a transverse rod 36 is mounted in their upper ends. Levers 37 are pivotally mounted upon the transverse rod 36 and are connected at their rear ends to levers 38 by means of links pivotally engaging levers 37 and ears 38ª on levers 38. Pedal levers 40 are as shown in Figure 2 formed of bars bent into U-shape to straddle links 39 and pivoted at 41 to the levers 38 and extend within convenient reach of the driver's seat 30. Helical springs 42 connect a plate secured between the two legs of the pedal levers 40 with the levers 38 and serve to cushion the action of said levers. A lever 43 pivoted at 44 on each standard 35 extends forwardly under the front end of the lever 37 and is moved downwardly when the front end of lever 37 is depressed. A T member 45 is mounted upon the crank portion of a crank shaft 46 and its front and rear arms are yieldably connected to the respective levers 37 and 43, as indicated at 47 or 48. Each of the connections 47 and 48 consists of a pin pivoted to an arm of the T 45 and loosely engaging the lever and a helical spring mounted upon the pin. A link 49 connects the front end of the lever 37 with the T 45. The springs of the yieldable connections exert an upward thrust on the respective levers 37 and 43 and are of different strength and length and operate in alternation, the one being compressed when the other is expanded and vice versa. A pulley 50 fast to the crank shaft 46 is connected by belt 51 to a pulley 52 fast to a shaft 53. Pulleys 54 fast to the shaft 53 are connected by belts 55 to pulleys 56 fast to a shaft 57 mounted in bearings 58 to receive a forward and backward adjustment. A rod 59 is connected to each of the bearings 58 and is operable by means of a lever 60 which is held in the required adjusted position by means of a toothed bar 61. A pinion 62 at each end of the shaft 57 is adapted to mesh with a gear wheel 63 fast to the drive wheel 10 which is loosely mounted on the axle or crank shaft 46. When the shaft 57 is thrown forward the pinions 62 engage the gear wheels 63 and rotate the wheels 10 to propel the machine. When the shaft 57 is drawn rearward the pinions 62 clear the gear wheels 63 and the brakes may be applied to control the speed or bring the machine to a stop. A brace frame 64—65 strengthens the frame, rod 36 and columns 66 in which the rods 28 are mounted.

It will be understood that the vehicle is propelled by the operator on seat 30 by alternately actuating the levers 40 with his feet, by pushing downwardly thereon. This operation serving to depress the rear ends of levers 37 by moving the rear ends of levers 38 downwardly and the links 39 connecting levers 37 and 38. This will impart an upward pull on the cranks of shaft 40 through the links 49 and the T-members 45, the springs 47 and 48 by expansion serving to start the upward movement of the levers, the springs being compressed during the downward movement of the levers. Power is delivered to the driving wheels 10 from pulley 50 on crank shaft 46 by belt 51 to pulley 52 secured to shaft 53, and from pulleys 54 secured to the same shaft, by belts 55 to pulleys 56 secured to shaft 57, said shaft also carrying gear pinions meshing with pinions 63 on the hubs of wheels 10. This structure of driving means including the pulleys and belts admit of sufficient slip to permit turning without requiring a differential.

What is claimed is:—

1. In a manually propelled vehicle, operating levers, a crank shaft, members mounted upon the crank portions of the crank shaft, a link connection between each of the pitmen and the co-operating lever, a link and spring connection between each pitman and an operating lever and link, said springs being disposed upon opposite sides of the co-acting pitman.

2. In a manually propelled vehicle, a crank shaft, pitmen mounted upon the crank portions of the crank shaft and having front and rear arms, an operating lever, a link connecting the operating lever and pitman, a second link pivoted at one end and having a sliding connection at the opposite end with the pitman, and springs between the respective arms of the pitman and the operating lever and link.

3. In a manually propelled vehicle, a main frame, a crank shaft, operating levers pivoted intermediate their ends, pitmen mounted upon the crank portions of the crank shaft, a link connection between the pitman and operating lever, a second link pivoted at one end and having sliding engagement at its opposite end with the pitman, and springs of different tensions disposed upon opposite sides of the pitman and connecting it with the operating lever and second link respectively.

4. In a manually propelled vehicle, upper and lower levers, a link connection between the levers, a pedal lever pivoted to the lower lever and a spring between the pedal lever and the lever to which the pedal lever is pivoted.

5. In a manually propelled vehicle, a crank shaft, drive wheels loosely mounted upon the crank shaft, means for rotating the crank shaft, a drive shaft movable towards and away from the crank shaft, coacting gearing between the drive shaft and the drive wheels, an intermediate shaft and connecting means between the intermediate shaft and the drive and crank shafts.

In testimony whereof I affix my signature.

ISAAC NETTLES.